United States Patent
Gong et al.

(10) Patent No.: US 10,025,854 B2
(45) Date of Patent: Jul. 17, 2018

(54) VIDEO SEARCHING

(75) Inventors: Shaogang Gong, Pinner (GB); Yogesh Raja, London (GB); Tao Xiang, Ilford (GB)

(73) Assignee: Vision Semantics Limited, London (GB)

( * ) Notice: Subject to any disclaimer, the term of this patent is extended or adjusted under 35 U.S.C. 154(b) by 899 days.

(21) Appl. No.: 14/237,787

(22) PCT Filed: Aug. 2, 2012

(86) PCT No.: PCT/GB2012/051878
§ 371 (c)(1),
(2), (4) Date: Aug. 27, 2014

(87) PCT Pub. No.: WO2013/021176
PCT Pub. Date: Feb. 14, 2013

(65) Prior Publication Data
US 2014/0365506 A1    Dec. 11, 2014

(30) Foreign Application Priority Data

Aug. 8, 2011 (GB) .................................. 1113633.0
Mar. 12, 2012 (GB) .................................. 1204302.2

(51) Int. Cl.
*G06F 17/30* (2006.01)
*G06K 9/00* (2006.01)

(52) U.S. Cl.
CPC .... *G06F 17/30793* (2013.01); *G06F 17/3053* (2013.01); *G06F 17/30386* (2013.01);
(Continued)

(58) Field of Classification Search
CPC ......... G06F 17/30386; G06F 17/30793; G06F 17/3053; G06K 9/00711
(Continued)

(56) References Cited

U.S. PATENT DOCUMENTS 4,464,779 A * 8/1984 Finkenzeller ........ G03B 42/025
378/176
6,751,354 B2 * 6/2004 Foote ................. G06K 9/00758
348/395.1

(Continued)

OTHER PUBLICATIONS

Martin Baum et al, "Multi-pose Face Recognition for Person Retrieval in Camera Networks", Advanced Video and Signal Based Surveillance (AVSS), 2010 Seventh IEEE International Conference on, IEEE, Aug. 29, 2010, pp. 441-447, XP031772062, ISBN: 978-1-4244-8310-5, Piscataway, NJ USA.

(Continued)

*Primary Examiner* — Phong H Nguyen
(74) *Attorney, Agent, or Firm* — Banner & Witcoff, Ltd.

(57) ABSTRACT

Method and processor for searching for a target within video data comprising the steps of receiving a target selected from within video data. Identifying a current selection of target matches for the selected target within further video data. Ranking the current selection of target matches. Receiving a signal confirming or rejecting one or more of the ranked target matches. Identifying a further selection of target matches for the confirmed target matches from the further video data. Indicating portions of the further video data containing the further selection of target matches.

19 Claims, 8 Drawing Sheets

(52) U.S. Cl.
CPC ..... *G06K 9/00362* (2013.01); *G06K 9/00771* (2013.01); *G06K 2209/21* (2013.01)

(58) Field of Classification Search
USPC .......................................................... 707/748
See application file for complete search history.

(56) References Cited

U.S. PATENT DOCUMENTS

| | | | |
|---|---|---|---|
| 2002/0028021 A1* | 3/2002 | Foote ................. | G06K 9/00758 382/224 |
| 2005/0122405 A1* | 6/2005 | Voss ....................... | H04N 5/232 348/211.2 |
| 2005/0196015 A1* | 9/2005 | Luo .................... | G06K 9/00234 382/103 |
| 2007/0266439 A1* | 11/2007 | Kraft .................... | H04L 63/083 726/26 |
| 2008/0204569 A1* | 8/2008 | Miller ................. | G06F 17/3079 348/222.1 |
| 2011/0019003 A1 | 6/2011 | Asa et al. | |

OTHER PUBLICATIONS

Yogesh Raja et al, "User-assisted visual search and tracking across distributed multi-camera networks", Proceedings of SPIE, Optics and Photonics for Counterterrorism and Crime Fighting VII, Sep. 19, 2011, pp. 81890Q-81890Q-14, XP55040820, vol. 8189, ISSN: 0277-786X, DOI: 10.1117/12.897673, Prague, Czech Republic.
P. Felzenszwalb et al, "Object Detection with Discriminatively Trained Part Based Models", IEEE Transactions on Pattern Analysis and Machine Intelligence , Sep. 2010, 32(9):1627-1645.
B. Prosser et al, "Person Re-Identification by Support Vector Ranking", British Machine Vision Conference, Sep. 2010, pp. 1-11, Aberystwyth, UK.
W. Zheng et al, "Person Re-Identification by Probabilistic Relative Distance Comparison", IEEE Conference on Computer Vision and Pattern Recognition, Jun. 2011, pp. 649-656, Colorado Springs, USA.
S. Gong et al, "An Investigation into Face Pose Distributions", IEEE International Conference on Automatic Face and Gesture Recognition, Oct. 1996, pp. 265-270, Vermont, USA.
C. Schmid, "Constructing Models for Content-based Image Retrieval", IEEE Conference on Computer Vision and Pattern Recognition, Jun. 2001, pp. 39-45, Kauai, Hawaii, USA.
J. Munkres, "Algorithms for the Assignment and Transportation Problems", Journal of the Society for Industrial and Applied Mathematics, 1957, 5(1):32-38.
H.W. Kuhn, "The Hungarian Method for the Assignment Problem", Naval Research Logistics Quarterly, 1955, 2:83-97.
C.C. Loy et al, "Time-Delayed Correlation Analysis for Multi-Camera Activity Understanding", International Journal of Computer Vision, 2010, 90(1): 106-129.
T. Joachims, "Optimizing Search Engines Using Clickthrough Data", ACM Conference on Knowledge Discovery and Data Mining, Jul. 2002, pp. 133-142, Edmonton, Canada.
International Search Report and Written Opinion dated Oct. 25, 2012 (PCT/GB2012/051878); ISA/EP.
UK Search Report dated Jul. 10, 2012.
Zheng et al. "Reidentification by Relative Distance Comparison", IEEE Transactions on Pattern Analysis and Machine Intelligence, vol. 35, No. 3 (2013) pp. 653-668. Annex A.
Gong "The Re-Identification Challenge", Springer-Verlag London (2014) pp. 1-20. Annex B.
Pachoud et al. "Macro-Cuboid Based Probabilistic Matching for Lip-Reading Digits", British Crown (2008), pp. 1-8. Annex C.

* cited by examiner

VIDEO SEARCHING

CROSS REFERENCE TO RELATED APPLICATIONS

This application claims priority to PCT application PCT/GB2012/051878, filed Aug. 2, 2012, entitled "Video Searching," which claims priority to United Kingdom Application No. 1113633.0, filed Aug. 8, 2011, and United Kingdom Application No. 1204302.2, filed Mar. 12, 2012.

FIELD OF THE INVENTION

The present invention relates to a method and apparatus for searching video data and in particular to searching for targets within the video data.

BACKGROUND OF THE INVENTION

Effective and automatic association of information from multiple independent sources is a valuable tool for a wide range of applications including data mining, object and entity search and association, visual surveillance across a distributed source of visual inputs, and the analysis of intelligence gathering and inference from multiple independent sources of different types of information at different places and times. Such collections of multi-source data, visual and non-visual, is often huge and either widely disparate (random) or closely akin (ambiguous) in their apparent attributes, with underlying intrinsic associations often being highly context dependent, latent and sparse, as well as difficult to quantify for automatic discovery and data association, resulting in the proverbial search for a needle in a haystack. Furthermore, it is not always possible to determine what specific associations of attributes are important prior to search. While various techniques such as the use of prior models or human interaction can help to narrow the search space or guide search with the benefit of human experience, they offer limited benefits when used in isolation.

For visual search and object re-identification in applications such as visual surveillance and multi-source visual object search, effective and reliable automatic object attribute extraction and association is very challenging in a large pool of multi-source visual data collected from distributed cameras or other sensor capturing sources. For instance, matching or tracking people across disjoint and disconnected different camera views, known as person re-identification, is challenging due to the lack of spatial and temporal constraints and visual appearance changes caused by variations in view angle, lighting, background clutter and occlusion. To address these challenges, existing methods and apparatus aim to extract object entity attributes in general and visual features in particular that are both distinctive and stable under appearance changes. However, most object attributes such as visual features and their combinations from disjoint multi-sources are neither stable nor distinctive and thus cannot be used directly and indiscriminately for object entity association across different sources.

Therefore, there is required a method and system that overcomes these problems.

SUMMARY OF THE INVENTION

Against this background and in accordance with a first aspect there is provided a method of searching for a target within video data comprising the steps of:

a. receiving a target selected from within video data;
b. identifying a current selection of target matches for the selected target within further video data;
c. ranking the current selection of target matches;
d. receiving a signal confirming or rejecting one or more of the ranked target matches;
e. identifying a further selection of target matches for the confirmed target matches from the further video data to replace the current selection of target matches; and
f. indicating portions of the further video data containing the selection of current target matches. Therefore, improved and more efficient target finding and tracking may be achieved. Indicating the portions may be an output of the actual video data, reference to it or other identification of such portions (e.g. frame or time code data). In some aspects, the method may also be considered a method of person re-identification. The further selection of target matches may replace the current selection of target matches in step e. The target may be selected by a user or another external interaction from a set of automatically identified targets. Identifying a current selection may use space-time profiling, for example.

Preferably, the potential target matches may be ranked according to match likelihood. Support Vector Machine or Probabilistic Relative Distance Comparison techniques may be used for ranking.

Optionally, the method may further comprise the step of storing the output portions of the further video data.

Optionally, the further selection of target matches may replace the current selection of target matches before iterating steps c to e. The confirmed matches may form new targets to be passed back to step c in order to generate multiple strands or searches for targets, including new strands.

Optionally, the method may further comprise the step of stitching together the located portions of further video data to form reconstructed video data of the target. The located portions may be stitched together from different locations and sources. The stitching may be achieved by referencing or reading certain portion of the video data determined by the method to contain the target. Therefore, an aggregation of such video clips may be generated or provided as an output.

Preferably, the signal may be received from a user. The user may be presented with potential matches to confirm or reject. Both online and offline interaction with a user may be utilised. For example, a selection of a set of visual attributes may be presented to a user (i.e. a human). These visual attributes and the user's response or input may be stored as a file, for example. The file may then be used to generate the signal. An online interaction may require the user to respond in real-time confirming or rejecting target matches. Alternatively, the signal may be based on pre-stored interactions with a user in order to confirm or reject the target matches.

Optionally, the video data and further video data may be generated from distributed, disjointed, and/or overlapping camera views. Other types and configurations of cameras and image generators may be used to provide the video data.

Preferably, the target is a person. Other target types may be used.

Preferably, the video data may be acquired from cameras at different locations.

Preferably, the ranking may be a relative ranking.

Optionally, the signal confirming or rejecting one or more of the ranked target matches may be generated from stored data. The data maybe stored in advance or before the method starts.

Optionally, the stored data may include data acquired by presenting a user with visual attributes. This can be pre-stored data acquired in advance or built up or added to over time. A combination of live and stored data may be used to generate the signal.

According to a second aspect, there is provided a processor configured to:

a. receive a target selected from within video data;

b. identify a current selection of target matches for the selected target within further video data;

c. rank the current selection of target matches;

d. receive a signal confirming or rejecting one or more of the ranked target matches;

e. identify a further selection of target matches for the confirmed target matches from the further video data to replace the current selection of target matches; and f. indicate portions of the further video data containing the selection of current target matches. The processor may be incorporated into a system or computer system configured to receive video data. The video data may be received directly from cameras or aggregated remotely and delivered over a network, for example. The processor may receive a target selected from a set of automatically identified targets, for example. Again, the signal may be generated by a user online or in real-time or offline, i.e. based on stored results generated by the user.

The method described above may be implemented as a computer program comprising program instructions to operate a computer. The computer program may be stored on a computer-readable medium or transmitted as a signal.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Figure 1:
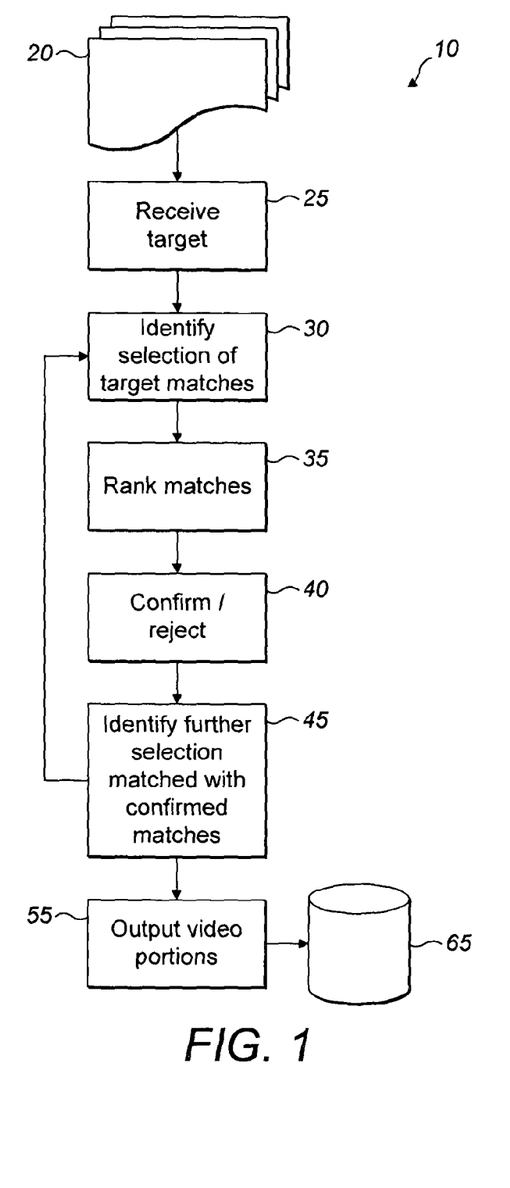
FIG. 1 shows a flowchart illustrating a method of searching for a target within video data, given by way of example only.

FIG. 1 shows a flowchart of a method 10 used to search for targets within video data. At a general level, this example implementation uses three main attributes:

1. A human or external interaction may be used together with an automatic machine search based object association process to guide a system towards more meaningful associations (i.e. target with matches). This may include previously unexpected associations as considered by a human user or other external interaction. Feedback from a user or users enables a computer algorithm based system to find more correct matches and in the process may recover previously unexpected but potentially highly relevant associations which may then be incorporated into the search process. This feedback iterative procedure may involve multiple iterations (cycles);

2. The use of "relative ranking" rather than absolute matching for comparing data from two different sources, improves context-dependent flexibility and may soften pitfalls that result from imposing absolute distance metrics that draw hard decision boundaries. The relative ranking model's internal parameters may also be updated automatically by incremental self-learning from the iterative procedure of external interaction by either a human user or other independent signals. Relative ranking applies in two ways: (a) different visual features are relatively ranked in relevance depending on the candidate matches being compared to the target; (b) a set of target matches are individually relatively ranked in terms of overall match confidence; and 3. The learning of population space-time correlation profiles which dynamically model the associational structures between the data-capturing sources in a multi-source informational domain. These space-time correlation profiles may take the form of multi-model probability distributions, which characterise the expected delay in appearance of moving targets between pairs of camera views. They are used to significantly narrow the search space when searching for target matches.

A computer or processor system may be used for user-guided iterative data mining of nominated object entities in the form of interactive feedback cycles to navigate and refine results from automatic machine search and in the process recover missing detections and discover previously unknown associations. The system performs an automatic retrospective machine search of user-nominated visual objects (in particular but not limited to people) within video imagery data captured from distributed disjoint or overlapping camera views and reconstructs the movement trails of the nominated objects within a synthesised or real patchwork of video segments from relevant views at relevant times. Detections and associations are made using a measure of relative ranking instead of absolute match scoring, and by inter- and intra-camera behaviour profiling of the space-time movement patterns of people as higher-level knowledge to reduce the search space. A user or external system then provides feedback by iteratively accepting or rejecting each of the ranked candidate matches as correct or incorrect for the system to iteratively refine and navigate its search. This "man-in-the-loop" process enables the recovery of missing detections and the discovery of new associations between nominated targets and previously unknown objects which may then become a new "branch" of the search process. Correct matches are then "stitched" together into a multi-camera video reconstruction of the movement of the target (and newly discovered associates) throughout the multi-camera environment for user visualisation.

Video data 20 may be provided from a variety of sources including separate video cameras that may record or stream images and be processed immediately or recoded for processing at a later time. A target to search for is received at step 25 of the method 10 shown in FIG. 1. This target may be selected from within the video data 20 or otherwise defined. At step 30, the method 10 identifies a selection of target matches or potential target matches for the received target from within the video data 20. Several different matching techniques may be used. The target matches are ranked at step 35 according to particular match criteria. A signal is then received confirming or rejecting the ranked matches at step 40. This signal may be received from a human user or external system input, for example. At step 45, further target matches or potential matches are made for the confirmed matches found at step 40. In other words, for some or all of the confirmed matches a further set of matches or potential matches are searched from within the video data 20. The method 10 then iterates one or more times using these further selected confirmed matches, which are passed back to step 30 as one or more new targets. In this way, the further selection of matches or potential matches form starting selected targets to be ranked confirmed or rejected and yet further matches with them made. This allows the method 10 to provide different strands or seeds for a search for targets.

The iteration procedure may stop after an arbitrary number of loops, a particular time period or under other criteria such as where the matches are deemed to be of a high enough quality. Once this occurs, then portions of video relating to matched targets are output at step 55. This may involve simply tagging or identifying portions of the video data 20 or obtaining particular video clips or portions of the received target from different parts of the video data 20. These portions or tagged data may be saved or stored in a database 65. Their locations or other identifiers may also or instead be stored in the database 65.

Figure 2A:
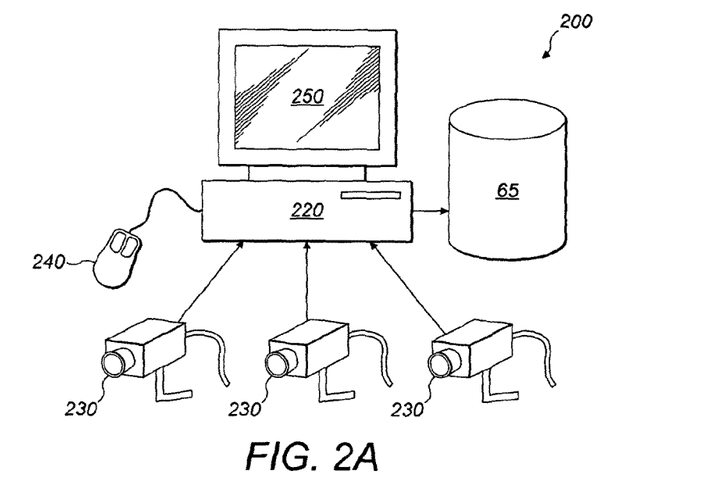
FIG. 2A shows a schematic diagram of an example system for implementing the method described shown in FIG. 1.

FIG. 2 shows a schematic diagram of an example system 200 for searching for targets within video data. This diagram is shown for simplicity and does not necessarily include every component. Common features are provided with the same reference numerals. The system 200 comprises a processor 220, the database 65 for storing output video data (or video portion/clip identifiers), multiple cameras 230 used to generate the video data or represent other sources of video data and an input device 240, which in this particular example is a computer mouse (other input devices may be used). The method 10 of FIG. 1 may be implemented using the processor 220, which may for instance be a server, embedded system or other processing device running a suitable operating system. The database 65 may be a file store, relational database or other electronic storage system. The database 65 may be incorporated within or external to the processor 220 or may reside within the same device. A visual display unit 250 maybe used to view the video data 20 or identified video portions or clips of a target or used to present potential matches to a user or operator.

Figure 2B:
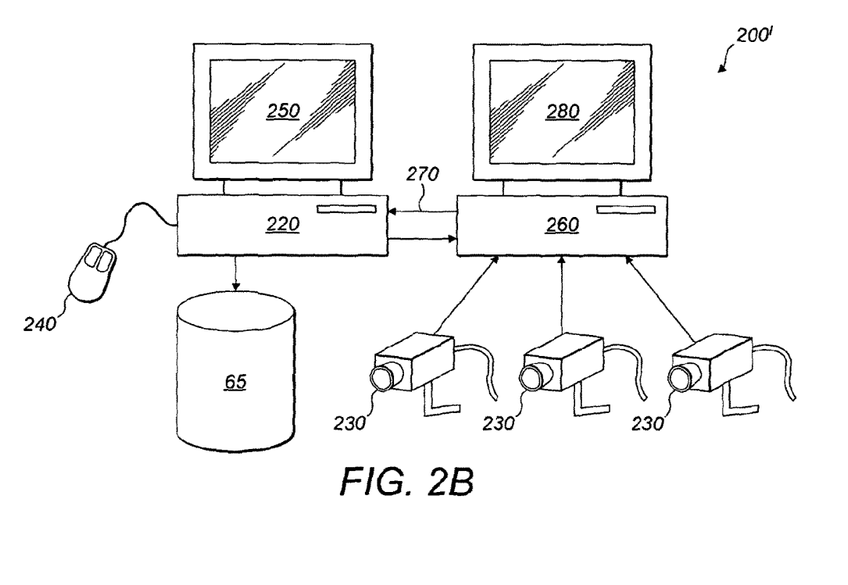
FIG. 2B shows a schematic diagram of a further example system for implementing the method described shown in FIG. 1.

FIG. 2B shows a further example system 200' for searching for targets within video data. Similar features to those described with reference to FIG. 2A are provided with the same reference numerals but will not be described again.

A remote video management system 260 may be used to aggregate or collect camera views or data from the multiple cameras 230. The processor 220 may carry out processing of the method 10 on the aggregated data provided across a network 270, which may be the Internet. A visual display unit 280 may be connected to the remote video management system 260 and used to display the results of the search provided by the processor 220. Various different configurations of combinations of features of the systems 200, 200' may be used. For example, video data may be both aggregated by one or more remote video management systems 260 and/or fed directly to the processor 220. The results may be displayed on either or both visual display units 250, 280. The remote video management system 260 may also comprise a storage database.

The processor 220 and/or the remote video management system 260 may be for example, Intel Core-i7 or equivalent having 16 GB RAM, 2 TB HDD, Windows 7 or Linus 64-bit OS. Suitable programming languages, tools and database software used to implement to the method 10 include C++/Visual Studio 2010, Java and Postgres DB.

Figure 3:
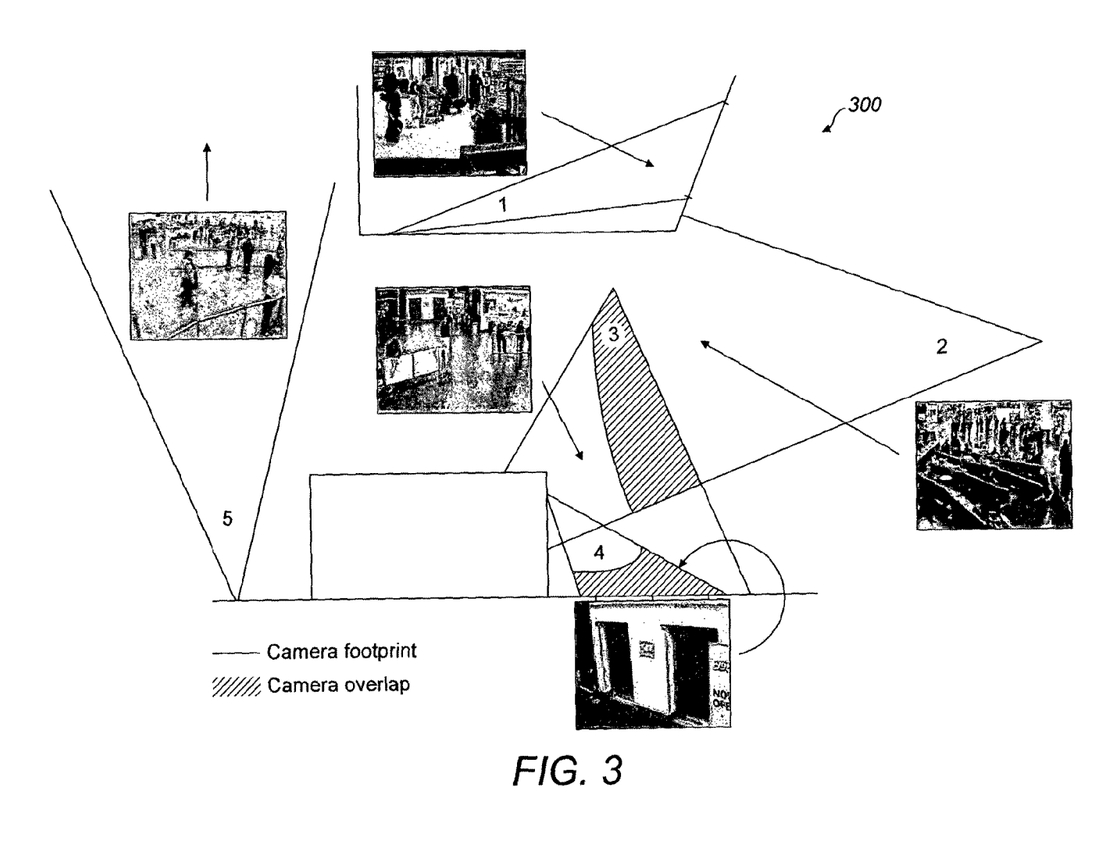
FIG. 3 shows a schematic diagram of an arrangement of camera views used to generate the video data of FIG. 1.

FIG. 3 shows a schematic diagram of an example arrangement of cameras that may be used to generate the video data 20 analysed in method 10. The camera arrangement 300 in this example contains five cameras (1 to 5), each having its own view of a space or area. For example, this space may be a train station, airport, transport network, urban area, commercial premises or public space. Some of these views are shown to overlap, whilst others have a viewing footprint that is separate from those of other or neighbouring cameras. Other types of camera views may be used, including those very closely spaced, far apart, or combinations of these extremes. It should be noted that each view may obtain very different images of the same target, which may include views from different aspects, heights, lighting, and distance to target, etc. In this example, the targets are people, but other targets may be used.

Figure 4:
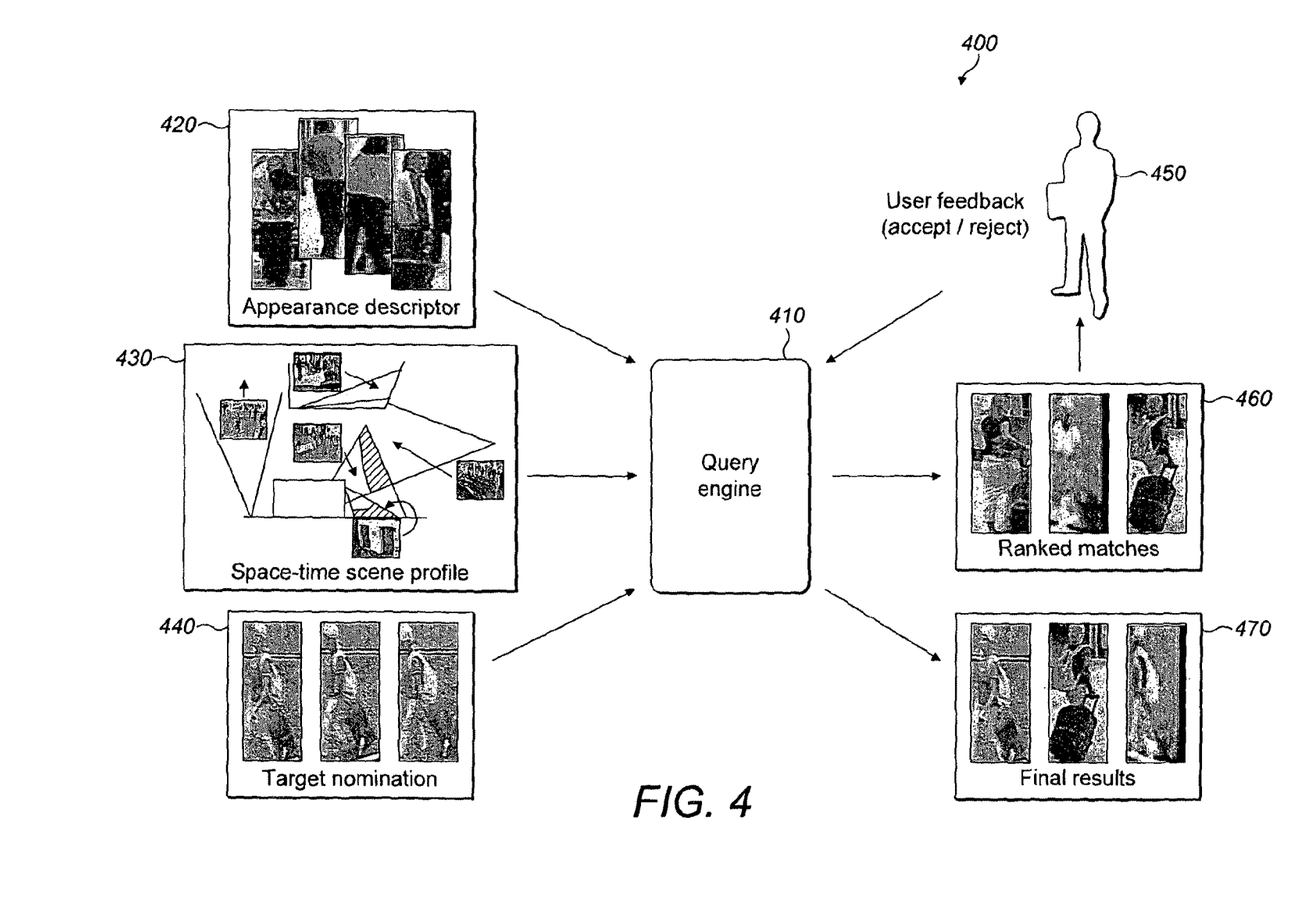
FIG. 4 shows a further schematic diagram of a system used to implement the method of FIG. 1.

FIG. 4 shows a further schematic diagram of a system 400 used to implement the method 10 described with reference to FIG. 1. In this example, a query engine executes the method 10 within the processor 220 (not shown in this figure) using various inputs. These inputs include an appearance descriptor 420 used to define a set of 29 visual features of both colour and intensity gradient texture used to describe the appearance of potential targets or matches under different viewing conditions or generated from different cameras. Methods used to provide or define appearance descriptors are described in "Person Re-identification by Probabilistic Relative Distance Comparison", Wei-Shi Zheng, Shaogang Gong and Tao Xiang, pages 649-656 In Proc. IEEE Conference on Computer Vision and Pattern Recognition, Colorado Springs, USA, June 2011 (http:www.samurai-eu.org/PDFZ/ZhengGongXiang_CVPR2011.pdf) incorporated by reference herein (see in particular section 2.4 "Feature Representation").

A space-time scene profile 430 may be provided to describe a particular camera arrangement 300 including different views and aspects used to form the video data (e.g. a description of the example arrangement of cameras 300 shown in FIG. 3). A particular target nomination 440 may be provided to the query engine 410 to determine a specific target used to be identified within the video data 20. This may be provided by a user selecting a particular target (e.g. person) from within a portion of video data 20, for example. The "confirm or reject" method step 40 may be provided by a user 450 as an input into the query engine 410. For example, a user may be presented with a selection of ranked matched (preferably a higher subset of the total rankings) on the visual display unit 250 or other output device. The user may provide a signal confirming or rejecting the ranked potential matches using the computer mouse 240 or other input device, for example. These confirmations or rejections may be based on ranked matches 460 presented to the user 450 typically in visual form. The final results 470 may be provided once the method 10 has been executed and any iteration ceased or completed.

The ranking step 35 may employ the space-time scene profiles 430 to narrow the search space to a set of potential target matches. It may then use many ranking procedures on these potential target matches, preferably based on appearance descriptor 420 features. An example ranking and scoring method is also described in "Person Re-identification by Probabilistic Relative Distance Comparison" cited in full above (see the description of RankSVM and its references in particular).

FIGS. 5 to 8 indicate various test results and comparisons between the present method 10 and other procedures. The test data set included 152 people with multiple tracklets per target ranging from 1 to 159 frames in a tracklet.

Figure 5:
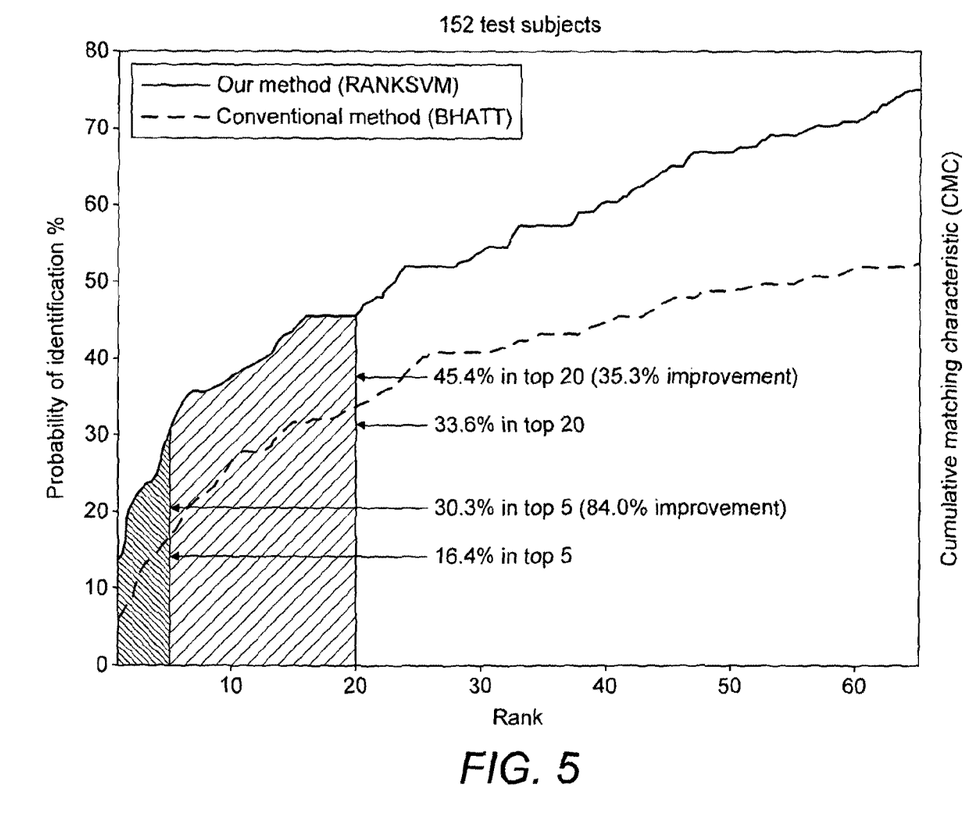
FIG. 5 shows a graph of test results comparing the method of FIG. 1 with other methods.

FIG. 5 shows a graph of probability of identification against rank where the rankings are relative. The graph shows a distinct superiority in performance relative to existing methods that do not use relative ranking.

Figure 6:
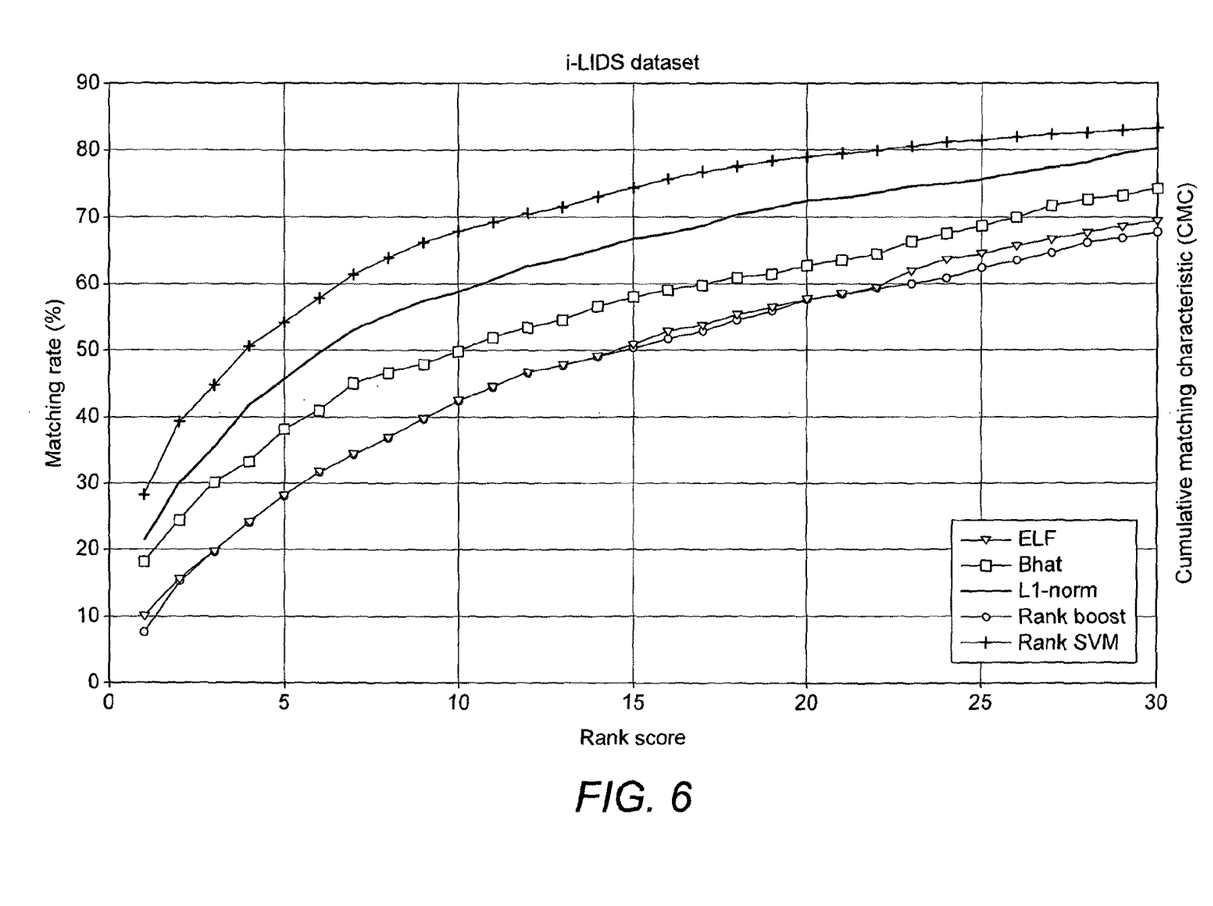
FIG. 6 shows a graph of test results comparing the method of FIG. 1 with other methods.

FIG. 6 shows matching rate against rank score for several different methods using the i-LIDS standardised video data set (http:www.homeoffice.gov.uk/science-research/hosdb/i-lids/). The present method is denoted as RankSVM (top line in graph).

Figure 7:
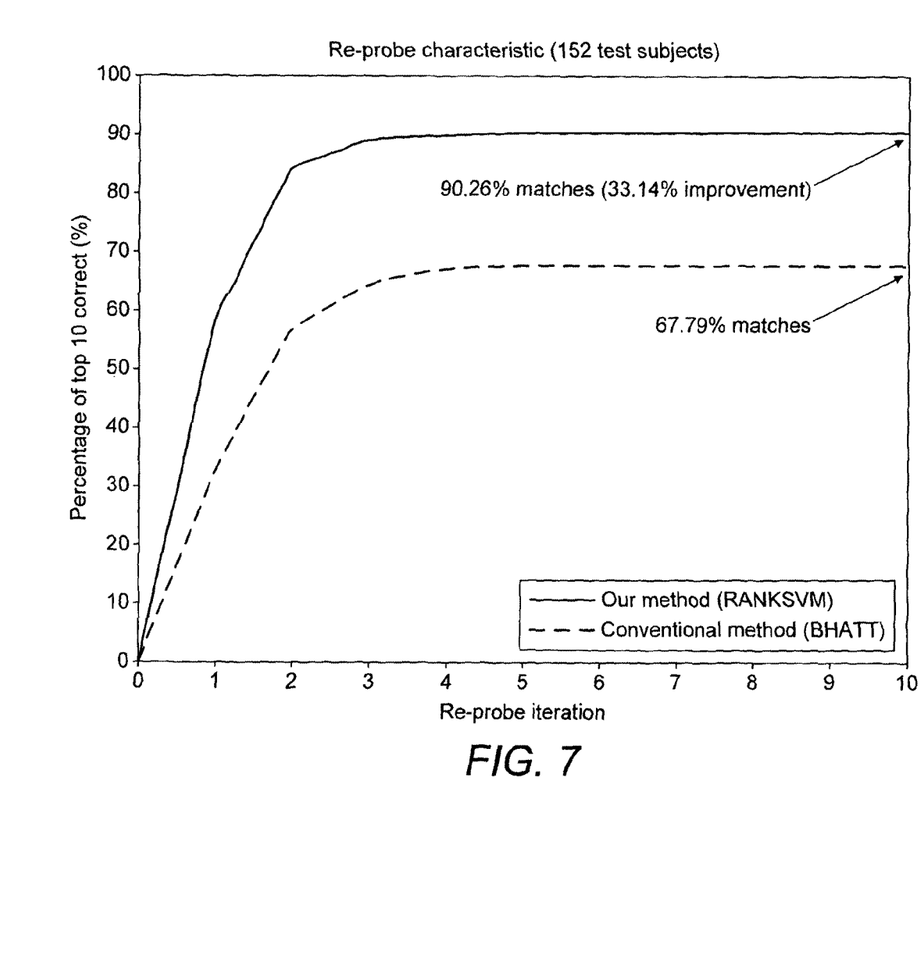
FIG. 7 shows a graph of test results comparing the method of FIG. 1 with other methods.

FIG. 7 illustrates results for multiple iterations of method 10 (RANKSVM—human feedback) compared with a conventional iterative procedure (BHATT).

Figure 8:
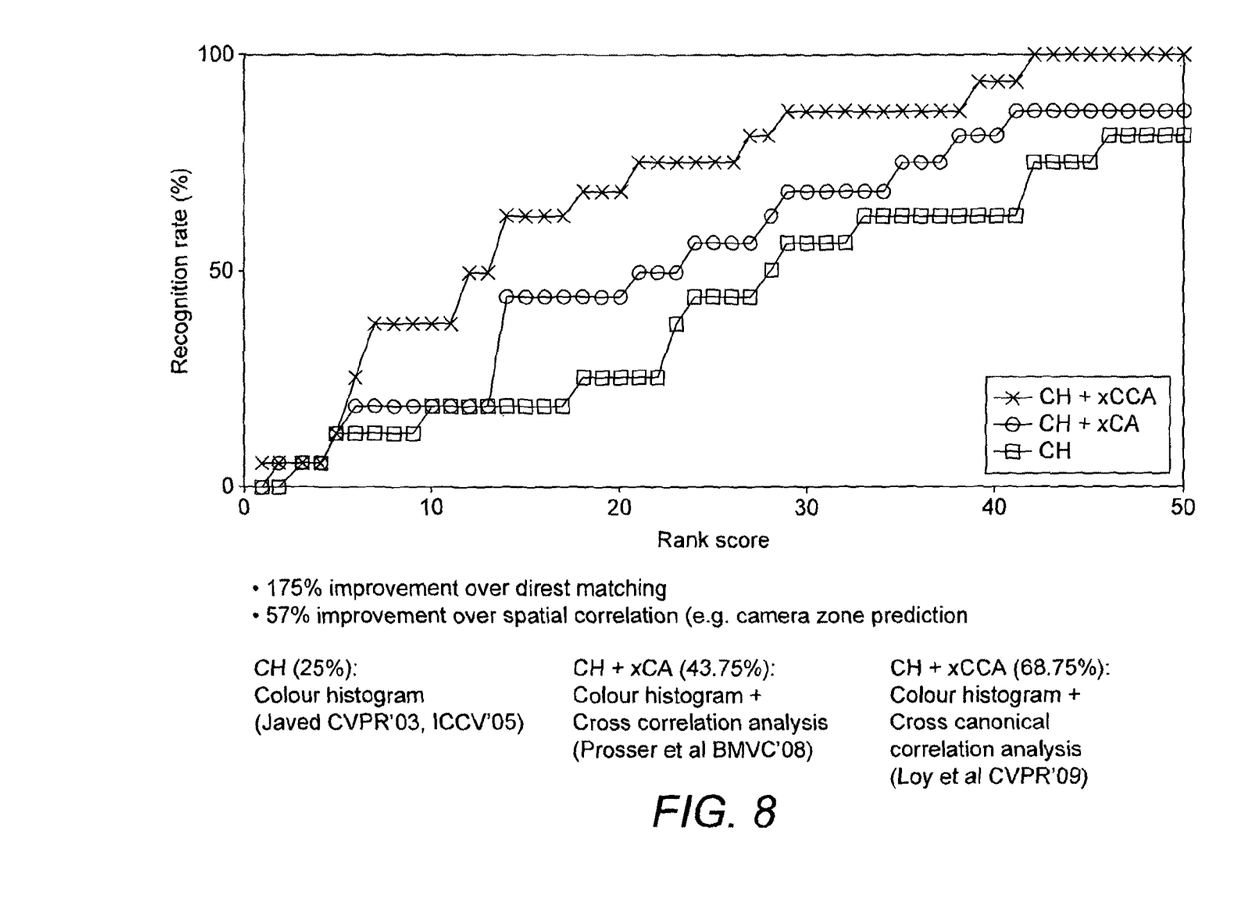
FIG. 8 shows a graph of test results comparing the method of FIG. 1 with other methods.

FIG. 8 illustrates a further graph of recognition rate against rank score illustrating the effect of space-time behaviour profiling.

Identifying targets, objects and/or entities of interest may use an object detector. For example, a parts-based object detector or detection method may be employed. Such a method is described in P. Felzenszwalb, R. Girshick, D. McAllester, D. Ramanan. "Object Detection with Discriminatively Trained Part Based Models", IEEE Transactions on Pattern Analysis and Machine Intelligence, 32(9):1627-1645, September 2010.

This may be trained to detect different classes of objects such as people, bags, luggage, cars and bicycles. The detector may be used to automatically detect potential targets as bounding boxes of image patches in image frames.

In an embodiment, 29 visual features appearance descriptor from several different colour models and texture filters. These are described in B. Prosser, W. Zheng, S. Gong, T. Xiang. "Person Re-Identification by Support Vector Ranking", British Machine Vision Conference, pages 1-11, Aberystwyth, UK, September 2010 and W. Zheng, S. Gong, T. Xiang. "Person Re-Identification by Probabilistic Relative Distance Comparison", IEEE Conference on Computer Vision and Pattern Recognition, pages 649-656, Colorado Springs, USA, June 2011.

In this example, there are 8 colour channels (RGB, HS and YCrCb) and 21 texture filters applied to a greyscale image; 8 Gabor filters (S. Gong, S. McKenna, J. J. Collins. "An Investigation into Face Pose Distributions", IEEE International Conference on Automatic Face and Gesture Recognition, pages 265-270, Vermont, USA, October 1996) and 13 Schmid filters (C. Schmid. "Constructing Models for Content-based Image Retrieval", IEEE Conference on Computer Vision and Pattern Recognition, pages 39-45, Kauai, Hi., USA, June 2001.) These feature descriptors are generated from the image patches within the bounding boxes generated by the object detector in the image detector. Within each bounding box, a histogram is generated to characterise the normalised distribution of feature values for each of the 29 features and then all 29 histograms are concatenated into a single vector as the feature descriptor for the image patch in this bounding box. This process of constructing a feature descriptor may also be done for individual vertically-arranged horizontal strips within each bounding box and then concatenated to yield a single vector descriptor.

The Munkres Assignment algorithm (J. Munkres. "Algorithms for the Assignment and Transportation Problems", Journal of the Society for Industrial and Applied Mathematics, 5(1):32-38, 1957), also known as the Hungarian algorithm (H. W. Kuhn. "The Hungarian Method for the Assignment Problem", Naval Research Logistics Quarterly, 2:83-97, 1955), is used to group the automatically detected bounding boxes into small trajectory segments (which we have named as "tracklets") of the moving objects. This amounts to assigning multiple detections to multiple tracks according to:

(a) the appearance mismatch based on the feature descriptor from component 2 between a detection and a track;

(b) the distance between the spatial position of a detection and the expected position for a track; and (c) the disparity between the dimensions of the bounding box for a detection and the expected size for a track. The entries in the cost matrix for the Munkres Assignment algorithm are computed based on a combination of these three cost components.

Space-time profiles may be generated to capture the probabilistic likelihood of the transition times for the detected objects between each pair of different camera views. These space-time profiles may take the form of discrete probability distribution histograms, one for each pair of camera views, defined over a range of transition times. They are learned automatically from video data depicting typical crowd motion behaviour in the environment concerned, using a novel technique we have formulated and named as Cross-Canonical Correlation Analysis (xCCA) (C. C. Loy, T. Xiang, S. Gong. "Time-Delayed Correlation Analysis for Multi-Camera Activity Understanding", International Journal of Computer Vision, 90(1): 106-129, 2010).

A ranking based model for person and/or automatic re-identification may be introduced, which may be named as Re-Identification by Ranking and is based on two techniques formulated and named as Ensemble-RankSVM (ERSVM) (B. Prosser, W. Zheng, S. Gong, T. Xiang. "Person Re-Identification by Support Vector Ranking", British Machine Vision Conference, pages 1-11, Aberystwyth, UK, September 2010) and Probabilistic Relative Distance Comparison (PRDC) (W. Zheng, S. Gong, T. Xiang. "Person Re-Identification by Probabilistic Relative Distance Comparison", IEEE Conference on Computer Vision and Pattern Recognition, pages 649-656, Colorado Springs, USA, June 2011). These models are learned to facilitate the matching of appearance across different camera views based on generated feature descriptors. ERSVM is a non-trivial extension of a standard Support Vector Machine Ranking (RankSVM) (T. Joachims. "Optimizing Search Engines Using Click-through Data", ACM Conference on Knowledge Discovery and Data Mining, pages 133-142, Edmonton, Canada, July 2002) that we specifically designed to address the computational intractability of RankSVM when employed to solve the person re-identification problem. PRDC generalises ERSVM by reformulating the ranking problem as a more general relative distance comparison problem for superior model learning characteristics (therefore better recognition performance) especially with less training data. There may be models for each pair of camera views to optimise the expected difference in appearance between different visual environments. We also exploit the RankSVM algorithm in such a way that it can be used to update (adapt) the models given binary feedback signals on candidate matches by an external agent or signal source.

During system operation:

(a) One processing module may automatically apply the object detector, the descriptor, and the Munkres Assignment algorithm (as described above) on each image frame of video inputs from multiple cameras to produce a set of tracklets for each camera view over time. These tracklets may be stored as metadata preferably in a dynamic SQL database.

(b) A separate processing module of the system operating simultaneously selects each generated tracklet from the database in turn within a camera view (A) and selects a set of candidate matches from each of all the other camera views (B) based on the space-time profile specific to the pair (A, B). Those candidate matches are retrieved whose time delay between their appearance in B and the appearance of the selected target in A yields a probability greater than a given threshold with respect to the space-time profile for A and B. Once this selection of candidate matches is derived, a matching score may be computed based on the similarity of the feature descriptors for the source tracklet from A with those of each of the derived selection of candidate matches. These match scores are stored in the metadata database for subsequent querying.

(c) During a query by an external agent, the system retrieves from the metadata database the space-time filtered selection of candidate matches along with the computed appearance matching scores from each of the cameras. The match scores may be pooled and sorted and the ranked results presented to the external agent. The external agent may trigger a binary feedback signal indicating each candidate match as positive or negative by likelihood.

(d) This binary feedback signal may be used to form samples for updating appearance matching models using the RankSVM algorithm.

(e) The positive matches alone may be used to: (a) "re-probe", i.e. each match marked as positive forms a new target and a corresponding search is conducted with results pooled with the current results and re-ranked to produce an updated selected of candidate matches; and (b) generate a chronologically-ordered reconstruction of the selected target's movements through the multi-camera environment.

An external feedback signal (external agent in general) may take the following example forms:

(1) Text-based keywords;

(2) Appearance description describing visual appearance (as per component 2) or/and target specific attributes (as per an independent biometrics recognition device, e.g. a face recognizer, or a personal belongings detector, e.g. handbag or bodily decorations); and (3) External space-time constraints based on independent cues from non-visual signal sources.

Text-based keywords may be correlated with appearance descriptors to cue individual objects for both an initial nominated target or to filter a selection of candidate matches as a form of feedback during the query process. Appearance and/or attribute descriptors may be automatically generated from a watch-list of individuals and used to initiate searches. A selection of such appearance and attribute descriptors describing the associates or nearby objects for a target of interest may be used to automatically generate feedback during a query process. External space-time constraints based on independent cues could provide feedback during a query process to further narrow the search space identified by the internal space-time profiles.

Targets may be selected from those automatically detected by the system; e.g. for people, each frame may be processed by a person detector using discriminatively-trained part based models. This may yield a set of bounding boxes corresponding to detected entities/objects in each frame. The individual frame detections may be grouped into tracklets comprising sequences of frame detections and which encapsulate trajectories of movement of these object entities over a period of time. No assumption is made on each object entity represented by a single/unique tracklet in each camera view. There can be several tracklets corresponding to each object entity over arbitrary numbers of frames in time. An external operating agent may select individually detected object entities by highlighting or signalling its detected bounding box in a given frame; the corresponding tracklet over a number of frames may then be used to characterise the target to be searched for, for example.

Space-time profiles may take the form of discrete probability distribution histograms between each pair of camera views. These describe the likely time delays for people transitioning between that pair of camera views. These may be learned automatically on video depicting typical motion behaviour in the environment concerned, using a technique named as Cross-Canonical Correlation Analysis (xCCA). Given a selected target from camera view A, a selection of candidate matches from any one or all other camera views B are selected based on the space-time profile specific to the pair A, B. Those candidate matches are retrieved whose time delay between their appearance in B and the appearance of the selected target in A yields a probability greater than a given threshold with respect to the space-time profile for A and B. This filtered selection from across all cameras may be ranked and ordered based on appearance matching with the selected target.

As will be appreciated by the skilled person, details of the above embodiment may be varied without departing from the scope of the present invention, as defined by the appended claims.

For example, instead of people as the selected and matched targets, animals, objects, cargo, vehicles or other moving objects may be tracked.

The human or user interaction may be live, online or in real-time. Alternatively, the human or user interaction may be stored for later use, i.e. offline.

The term "Man-in-the-loop" encompasses both direct on-line interaction between a user and the system, as well as off-line setting of system parameters also by a human. For example, the previous selection of a set of visual attributes by a human for the system to focus on can be stored in a file, which the system can then read from and use for selecting matches in the iterative reprobe process. In either case, the system receives a signal, whether this signal is generated on-line (in the case of a direct human user) or off-line (in the case of a previous selection of parameters by a human user).

Many combinations, modifications, or alterations to the features of the above embodiments will be readily apparent to a skilled person and are intended to form part of the invention. Any of the features described specifically relating to one embodiment or example may be used in any other embodiment by making the appropriate changes.

The invention claimed is:

1. A method of searching for a target within video data comprising the steps of:
   a. receiving a target selected from within video data collected from a first camera view, the target defined by a descriptor vector;

b. identifying video data collected from a set of second camera views imaging one or more locations different to a location imaged in the first camera view, the video data identified according to space-time profiling based on the distance between the location imaged in the first camera view and the location imaged in each of the set of second camera views and the difference between the time of collection of the first camera view compared to the time of collection of each of the set of second camera views, the identified video data comprising the set of second camera views wherein a probability of identifying a candidate matching the target according to the space-time profiling is greater than a given threshold;

c. identifying a selection of candidate matches to the target within the identified video data, each candidate match defined by a descriptor vector;

d. ranking the candidate matches wherein the ranking is a relative ranking comprising a ranking of the candidate matches according to the relevance of different visual features within the appearance descriptor when comparing each candidate match to the selected target, and a ranking of the candidate matches according to overall match confidence;

e. receiving a signal confirming or rejecting one or more of the ranked candidate matches as a match to the target;

f. identifying a further selection of candidate matches from further video data by repeating steps b to d wherein each of the confirmed candidate matches at step e is used as a target; and g. indicating portions of the further video data containing the further selection of candidate matches to the target.

2. The method of claim 1 further comprising the step of:

h. storing the portions of the further video data output at step g.

3. The method according to claim 1, wherein the further selection of candidate matches replaces the current targets before iterating steps d to f.

4. The method according to claim 1 further comprising the step of stitching together the further video data containing the further selection of candidate matches to form reconstructed video data of the target.

5. The method according to claim 1, wherein the signal at step e is received from a user.

6. The method according to claim 1, wherein the video data collected from a first camera view, video data collected from a set of second camera views and further video data are generated from distributed, disjointed, and/or overlapping camera views.

7. The method according to claim 1, wherein the target is a person.

8. The method according to claim 1, wherein the video data collected from a first camera view, video data collected from a set of second camera views and further video data is acquired from cameras at different locations.

9. The method of claim 1, wherein space-time profiling includes generating a discrete probability distribution histogram of different video data imaging one or more locations different to a location imaged in the first camera view.

10. The method according to claim 1, wherein the signal confirming or rejecting one or more of the ranked candidate matches is generated from stored data.

11. The method of claim 10, wherein the stored data includes data acquired by presenting a user with visual attributes.

12. A processor configured to:

a. receive a target selected from within video data collected from a first camera view, the target defined by a descriptor vector;

b. identify video data collected from a set of second camera views imaging one or more locations different to a location imaged in the first camera view, the video data identified according to space-time profiling based on the distance between the location imaged in the first camera view and the location imaged in each of the set of second camera views and the difference between the time of collection of the first camera view compared to the time of collection of each of the set of second camera views, the identified video data comprising the set of second camera views wherein a probability of identifying a candidate matching the target according to the space-time profiling is greater than a given threshold;

c. identify a selection of candidate matches to the target within the identified video data, each candidate match defined by a descriptor vector;

d. rank the candidate matches wherein the ranking is a relative ranking comprising a ranking of the candidate matches according to the relevance of different visual features within the appearance descriptor when comparing each candidate match to the selected target, and a ranking of the candidate matches according to overall match confidence;

e. receive a signal confirming or rejecting one or more of the ranked candidate matches as a match to the target;

f. identify a further selection of candidate matches from further video data by repeating steps b to d wherein each of the confirmed candidate matches at step e is used as a target; and g. indicate portions of the further video data containing the further selection of candidate matches to the target.

13. The system of claim 12, wherein the instructions further configure the system to perform storing the output portions of the further video data.

14. The system according to claim 12, wherein the further selection of candidate matches replaces the current selection of candidate matches before iterating steps d to f.

15. The system according to claim 12 wherein the instructions further configure the system to perform stitching together the located portions of further video data to form reconstructed video data of the target.

16. The system according to claim 12, wherein the signal is received from a user.

17. One or more non-transitory computer readable media storing computer readable instructions that, when executed, cause a system to:

a. receive a target selected from within video data collected from a first camera view, the target defined by a descriptor vector;

b. identify video data collected from a set of second camera views imaging one or more locations different to a location imaged in the first camera view, the video data identified according to space-time profiling based on the distance between the location imaged in the first camera view and the location imaged in each of the set of second camera views and the difference between the time of collection of the first camera view compared to the time of collection of each of the set of second camera views, the identified video data comprising the set of second camera views wherein a probability of identifying a candidate matching the target according to the space-time profiling is greater than a given threshold c. identify a selection of candidate matches to the target within the identified video data, each candidate match defined by a descriptor vector;

d. rank the candidate matches wherein the ranking is a relative ranking comprising a ranking of the candidate matches according to the relevance of different visual features within the appearance descriptor when comparing each candidate match to the selected target, and a ranking of the candidate matches according to overall match confidence;

e. receive a signal confirming or rejecting one or more of the ranked candidate matches as a match to the target;

f. identify a further selection of candidate matches from further video data by repeating steps b to d wherein each of the confirmed candidate matches at step e is used as a target; and g. indicate portions of the further video data containing the further selection of candidate matches to the target.

18. The computer readable media according to claim 17, wherein the further selection of candidate matches replaces the current selection of candidate matches before iterating steps d to f.

19. The computer readable media according to claim 17 wherein the instructions further cause the system to perform stitching together the located portions of further video data to form reconstructed video data of the target.

* * * * *